United States Patent
Peckham et al.

(10) Patent No.: US 9,075,634 B2
(45) Date of Patent: Jul. 7, 2015

(54) MINIMIZING OVERHEAD IN RESOLVING OPERATING SYSTEM SYMBOLS

(75) Inventors: Stephen B. Peckham, Austin, TX (US); Donald R. Stence, Pflugerville, TX (US); Marc J. Stephenson, Austin, TX (US)

(73) Assignee: International Business Machines Corporation, Armonk, NY (US)

(\*) Notice: Subject to any disclaimer, the term of this patent is extended or adjusted under 35 U.S.C. 154(b) by 1363 days.

(21) Appl. No.: 12/834,356

(22) Filed: Jul. 12, 2010

(65) Prior Publication Data

US 2012/0011512 A1 Jan. 12, 2012

(51) Int. Cl.
*G06F 9/44* (2006.01)
*G06F 9/445* (2006.01)
*G06F 9/455* (2006.01)

(52) U.S. Cl.
CPC ........ *G06F 9/44521* (2013.01); *G06F 9/45533* (2013.01); *G06F 9/44552* (2013.01)

(58) Field of Classification Search
CPC .................................................. G06F 9/44552
See application file for complete search history.

(56) References Cited

U.S. PATENT DOCUMENTS

| | | | | |
|---|---|---|---|---|
| 5,734,822 A | * | 3/1998 | Houha et al. | 717/167 |
| 6,075,939 A | * | 6/2000 | Bunnell et al. | 717/107 |
| 6,704,925 B1 | * | 3/2004 | Bugnion | 717/138 |
| 6,766,514 B1 | * | 7/2004 | Moore | 717/159 |
| 2002/0087956 A1 | * | 7/2002 | Darlet | 717/159 |
| 2004/0133761 A1 | * | 7/2004 | Goodman | 711/210 |
| 2004/0187130 A1 | * | 9/2004 | Koning | 718/100 |
| 2005/0144619 A1 | * | 6/2005 | Newman | 717/177 |

\* cited by examiner

*Primary Examiner* — Neveen Abel Jalil
*Assistant Examiner* — Michael K Tamaru
(74) *Attorney, Agent, or Firm* — DeLizio Law, PLLC (57) ABSTRACT

A symbol resolution unit can be configured for resolving conflicting operating system symbols. A default symbol resolution data structure can be accessed to resolve a symbol associated with a client of an operating system. A first data entry that corresponds to the symbol is located in the default symbol resolution data structure. It is determined that the first data entry indicates that the symbol is marked special (e.g., as a conflicting operating system symbol). A secondary symbol resolution data structure is accessed in response to determining that the first data entry indicates that the symbol is marked special. A second data entry that corresponds to the symbol is located in the secondary symbol resolution data structure based, at least in part, on an identifier of the client. A memory location indicated in the second data entry that corresponds to the symbol is provided to the client.

20 Claims, 4 Drawing Sheets

MINIMIZING OVERHEAD IN RESOLVING OPERATING SYSTEM SYMBOLS

BACKGROUND

Embodiments of the inventive subject matter generally relate to the field of operating systems and, more particularly, to minimizing overhead in resolving operating system symbols.

Functionality of an operating system kernel can be extended via dynamically loadable modules also known as kernel extensions. The kernel extensions can interact with services provided by the operating system kernel and can extend the services of, or provide new services to, programs that execute on the operating system. Programs and shared libraries might reference symbols in the operating system kernel. The operating system kernel resolves the references and identifies information associated with the symbols. Currently, various versioning systems are used to differentiate between different versions of operating system symbols and to provide unique symbol resolution to the programs/shared libraries based on the version of the symbol requested.

SUMMARY

Embodiments include a method for resolving conflicting operating system symbols. A default symbol resolution data structure is accessed to resolve a symbol associated with a client of an operating system. A first data entry that corresponds to the symbol is located in the default symbol resolution data structure. It is determined that the first data entry indicates that the symbol is marked special. Being marked special indicates that the symbol is a conflicting operating system symbol. A secondary symbol resolution data structure is accessed in response to determining that the first data entry indicates that the symbol is marked special. The secondary symbol resolution data structure comprises a plurality of data entries. The plurality of data entries corresponds to one or more conflicting operating systems symbols, and each data entry of the plurality of data entries comprises an indication of the symbol and an identifier of a client. A second data entry that corresponds to the symbol is located in the secondary symbol resolution data structure based, at least in part, on an identifier of the client. A memory location indicated in the second data entry that corresponds to the symbol is provided to the client.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to resolving conflicting symbols across workload partitions (WPARs) in an IBM® Advanced Interactive Executive (AIX®) operating system, in other embodiments, operations described herein can also be implemented for resolving conflicting symbols in any suitable operating system and/or across other implementations of operating system-level virtualization (e.g., across containers/zones, virtual environments, virtual private servers (VPS), etc.) or across individual applications. In other instances, well-known instruction instances, protocols, structures, and techniques have not been shown in detail in order not to obfuscate the description.

Organizations employ operating system virtualization or workload partitions (WPARs) to organize and isolate workloads in accordance with business requirements, organizational guidelines, etc., while efficiently utilizing available equipment. For instance, an administrator can create different WPARs for a marketing department database and associated applications ("marketing database workload"), an accounting department database and associated applications ("accounting database workload"), and legal department electronic mail server ("legal e-mail workload"). Instead of using 3 different servers, the resources of a single server can be used to satisfy the needs of the 3 workloads. Each WPAR presents to the respective hosted workload (i.e., processes, application(s) of the workload) as an instance of an operating system with its own namespace and process environment.

Multiple WPARs within an operating system might request for different versions of the same symbol or might generate symbols with the same name but that require different symbol resolution. Operating system symbols that have different resolutions from one WPAR to another WPAR (or from one process to another process) can cause conflicts and incorrect symbol resolution. Currently, symbol versioning techniques are employed to provide unique symbol resolution for operating system symbols depending on the version of the symbol referenced by the WPAR. However, symbol versioning can be complicated because it involves configuring compilation processes and linkage processes within the operating system to track the different versions of the symbols supported by the operating system (e.g., linking a symbol by name and by version). Symbol versioning also requires keeping track of new/updated versions of the symbols, determining whether a version of the symbol requested by the WPAR exists, when/whether to delete an old version of the symbol, etc. Thus, symbol versioning can be complex and can require additional maintenance. Unique symbol resolution of operating system symbols can be provided by maintaining a different symbol resolution table for each WPAR in the operating system. However, this can result in the operating system incurring additional overhead in processing all symbols, irrespective of whether or not the symbols require a unique resolution. Moreover, maintaining multiple such tables can be complex and resource intensive.

Operating system symbols that require unique symbol resolution (e.g., symbols with the same symbol name across two or more WPARs) can be identified as conflicting operating system symbols. The operating system can maintain a default symbol resolution table for all symbols associated with all the WPARs and can access a secondary symbol resolution table to resolve the conflicting operating system symbols. The conflicting operating system symbols can be marked as "special" and are herein also referred to as special operating system symbols. The special operating system symbols can be identified by inserting a predetermined mark into data entries that correspond to the special operating system symbols. The predetermined mark can serve to invalidate the data entries, in the default symbol resolution table, that correspond to the special operating system symbols, causing symbol resolution for the special operating system symbols to fail in the default symbol resolution table. Accordingly, a secondary symbol resolution table can be accessed to resolve the special operating system symbol based on symbol information (e.g., a symbol identifier) and an identifier of the WPAR that requested the symbol resolution. Such a technique for accessing the secondary symbol lookup table to resolve the operating system symbols based on the indication of the WPAR with which the symbol is associated may be implemented only for special operating system symbols (i.e., operating system symbols that might result in collision). In other words, all non-special operating system symbols are resolved by looking up the operating system symbol in the default symbol resolution table. This can minimize the overhead incurred associated with resolving the operating system symbols. This also precludes the need for maintaining a unique symbol resolution table for each WPAR, thus minimizing resources associated with storing and maintaining a symbol resolution table for each WPAR. This in turn can improve efficiency of the symbol resolution.

Figure 1:
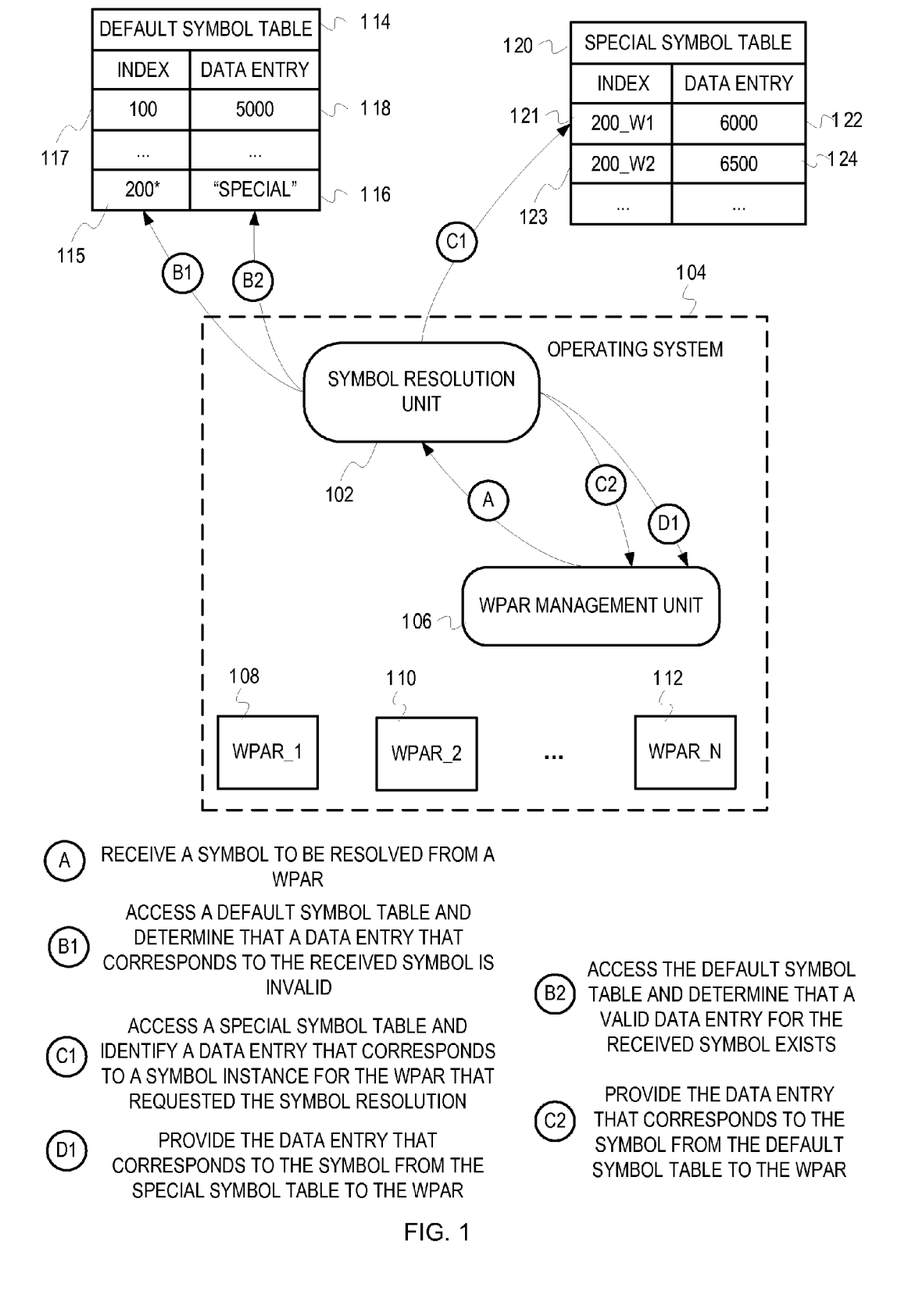
FIG. 1 is an example conceptual diagram illustrating example operations for resolving conflicting operating system symbols.

FIG. 1 is an example conceptual diagram illustrating example operations for resolving conflicting operating system symbols. FIG. 1 depicts an operating system 104 (e.g., IBM AIX operating system) comprising workload partitions (WPARs) 108, 110, and 112 and a WPAR management unit 106. FIG. 1 also depicts a symbol resolution unit 102, a default symbol table 114, and a special symbol table 120. The symbol resolution unit 102 interfaces with the default symbol table 114 and the special symbol table 120 to resolve operating system symbols as will be described below.

The WPAR management unit 106 creates the WPARs 108, 110, and 112 within the operating system 104. The WPARs 108, 110, and 112 are contained environments that are created from and share resources (e.g., memory and processor resources) of a single instance of the operating system 104. For example, the WPARs 108, 110, and 112 may share a common AIX kernel and may comprise their own file systems, users, administrators, network space, etc. Each of the WPARs 108, 110, and 112 can comprise applications and other workloads that execute within the contained environment of the WPAR.

When a kernel extension or an application is loaded within a WPAR, a loader process in the operating system 104 executes various operations including validation, reading executable content into main memory, resolving symbols used by the application/kernel extension, etc. Symbol resolution can occur as a by-product of loading the user space application or the kernel extension. The loaded kernel extension references symbols (e.g., functions, variables, services) in a base operating system kernel. Symbol resolution enables the referenced symbol to be mapped to a symbol definition associated with the symbol (e.g., a memory address that indicates processing operations associated with the symbol). For example, during symbol resolution, a symbol "foo" is tied to an appropriate memory address associated with the symbol "foo". The memory address can reference a function, which is to be executed on encountering subsequent references to the symbol "foo". The user space application may also comprise various symbols (e.g., system calls) associated with the application and symbol resolution of the user space application symbols can comprise mapping the system call to a memory location to which control should pass on encountering the system call. The symbol resolution unit 102 can execute operations described herein during a linking process for tying the symbols to their appropriate symbol definitions based on whether the symbols are conflicting symbols.

During symbol resolution, various events can trigger conflicts between symbols. In one implementation, the WPAR 108 may load a kernel extension that may redefine a symbol that is already defined in a base operating system kernel. Conflicts between symbols can arise when the WPAR 108 references the symbol as defined by the kernel extension and/or another WPAR 110 (which does not require the kernel extension) references the symbol as defined by the base operating system kernel. In another implementation, a first WPAR 108 may load a first kernel extension for functionality required by the WPAR 108, and a second WPAR 110 may load a second kernel extension for functionality required by the WPAR 110. The first and the second kernel extensions may comprise a symbol with the same name but with different functionality (i.e., different symbol resolution). Conflicts between symbols can arise when the WPAR 108 references the symbol as defined by the first kernel extension and the WPAR 110 references the symbol as defined by the second kernel extension. In another implementation, conflicts between symbols can arise in a compatibility runtime environment (CRE) WPAR. The CRE WPAR can execute code (and other processes) that are linked to a version of the operating system that is lower than the version of the base operating system 104. For example, the base operating system may be a version 7.1 AIX operating system, while the CRE WPAR may execute processes that are linked to a version 5.2 AIX operating system (e.g., access libraries and hardware in accordance with architecture that is specific to the version 5.2 AIX operating system). For the CRE WPAR to execute properly, the operating system kernel is required to maintain symbol definitions for the earlier version of the operating system as well as symbol definitions for the global operating system. Thus, two different versions (e.g., version 5.2 and version 7.1) of the symbol may be maintained by the operating system kernel. Conflicts between symbols can arise when the CRE WPAR references a symbol that is defined differently by the earlier version of the operating system and by the later version of the operating system. The symbol resolution unit 102 can implement functionality for identifying conflicting symbols and for resolving the conflicting symbols while minimizing processing overhead as will be described below.

At stage A, the symbol resolution unit 102 receives a symbol to be resolved from the WPAR 108. The symbol resolution unit 102 performs a different set of operations for symbol resolution depending on whether the symbol received at stage A is marked as a special symbol (e.g., whether the symbol generated by the WPAR 108 conflicts with a symbol generated by another WPAR 110) and depending on whether a valid data entry that corresponds to the symbol can be identified in the default symbol table 114. Stages B1, C1, and D1 describe operations of the symbol resolution unit 102 if a valid data entry that corresponds to the symbol cannot be identified in the default symbol table 114 and if the symbol is identified as a special symbol. Stages B2 and C2 describe operations of the symbol resolution unit 102 if a valid data entry that corresponds to the symbol can be identified in the default symbol table 114.

At stage B1, the symbol resolution unit 102 accesses the default symbol table 114 and determines that a data entry 116 that corresponds to the received symbol is invalid. The default symbol table is a global symbol resolution table that comprises information about symbols associated with each of the WPARs 108, 110, and 112. The default symbol table 114 may be any suitable data structure (e.g., an array, a list, etc.) that comprises an indication of the symbol (e.g., a hash value or a truncated hash value associated with the symbol) and information that corresponds to the symbol. The information that corresponds to the symbol can comprise a location in memory from which content corresponding to the symbol can be read, a location in memory at which instructions for subsequent processing of the symbol can be identified, etc. For example, the information can comprise a reference to a file, a function, a routine, a procedure, a binary module, etc.

In one implementation, the default symbol table 114 may be implemented as a hash table. The symbol resolution unit 102 generates a hash value of the symbol received at stage A, and uses the hash value of the symbol (or a subset of the hash value of the symbol) as an index 115 to identify the data entry 116 that corresponds to the symbol in the default symbol table 114. The symbol resolution unit 102 determines that the index 115 associated with the symbol is "200". The symbol resolution unit 102 looks up the index 115 in the default symbol table 114 and identifies the data entry 116 that corresponds to the index 115. In other implementations, the default symbol table 114 can be implemented as a hierarchical (or multi-level) symbol table for locating symbols with different symbol scopes. On identifying the data entry 116 that corresponds to the symbol, the symbol resolution unit 102 analyses the data entry 116 and determines that the data entry 116 is not a valid data entry. For example, based on knowledge that the data entries of the default symbol table 114 comprise memory addresses, the symbol resolution unit 102 may determine that content of the data entry 116 is not within a predetermined range of memory addresses, that the content of the data entry 116 comprises a combination of characters/numbers that do not correspond to a valid memory address, etc. The symbol resolution unit 102 may also determine that the symbol does not correspond to a valid data entry if a data entry for the symbol cannot be found in the default symbol table 114. In FIG. 1, the index 115 associated with the symbol is altered to indicate that the data entry 116 that corresponds to the symbol in the default symbol table 114 is not valid. Because the index 115 associated with the symbol is altered, the symbol may not be identified in the global symbol table 114. In FIG. 1, because the index 115 is modified to "200*", the index "200" that corresponds to the symbol is not identified in the default symbol table 114.

On determining that the symbol does not correspond to a valid data entry 116 in the default symbol table 114, the symbol resolution unit 102 can initiate symbol error processing operations. In one implementation, the symbol resolution unit 102 may execute the symbol error processing operations. In another implementation, the symbol resolution unit 102 may invoke a distinct symbol error processing unit (not shown) to execute the symbol error processing operations and to resolve the symbol. As part of the symbol error processing operations, the symbol resolution unit 102 analyses the data entry 116 to determine whether the data entry 116 is invalid because it comprises a predetermined special mark. As described above, the operating system kernel can maintain different versions of a symbol and references a symbol for which different versions exist (e.g., by a WPAR, a CRE WPAR, etc.) can result in conflicts and in improper symbol resolution (e.g. a WPAR receiving an incorrect memory location for the symbol, the WPAR receiving information that corresponds to an incorrect instance of the symbol, etc.). The predetermined special mark invalidates the data entry 116 that corresponds to the symbol in the default symbol table 114 and serves to indicate that the secondary symbol table 120 is to be accessed to determine a WPAR-specific symbol resolution as will be described in stage C1. In FIG. 1, the predetermined special mark is the word "SPECIAL". The symbol resolution unit 102 reads the content of the data entry 116, determines that the content of the data entry 116 comprises the word "SPECIAL", and accordingly identifies the symbol as a special symbol. It is noted that although FIG. 1 depicts the predetermined special mark being configured to be the word "SPECIAL", in other embodiments, the predetermined special mark can comprise any suitable combination of characters, numbers, a NULL value, etc.

At stage C1, the symbol resolution unit 102 accesses the special symbol table 120 and identifies a data entry 122 that corresponds to a symbol instance for the WPAR 108 that requested the symbol resolution. In one implementation, the memory location at which the special symbol table 120 can be accessed may be pre-configured (e.g., hardwired as part of the symbol resolution unit 102 or stored in a known memory location). In another implementation, the predetermined special mark determines the memory location at which the special symbol table 120 may be referenced. The symbol resolution unit 102 identifies the data entry 122 that corresponds to the received symbol based on the received symbol and also based on an identifier of the WPAR 108 that requested the symbol resolution. The symbol resolution unit 102 can determine the identifier of the WPAR 108 from the request for symbol resolution (received at stage A) or can request the identifier of the WPAR 108 from the WPAR management unit 106. The special symbol table 120 can comprise multiple data entries that correspond to the symbol but that correspond to a different WPAR. The appropriate data entry for the symbol to be provided to the WPAR can be identified based on the identifier of the WPAR. As depicted in FIG. 1, the special symbol table 120 comprises a data entry 122 that corresponds to a first instance of the symbol for the WPAR 108 and a data entry 124 that corresponds to a second instance of the symbol for the WPAR 110.

In one implementation, the special symbol table 120 can be implemented as a hash table. The symbol resolution unit 102 can calculate a new hash value based on the symbol and the WPAR identifier. The symbol resolution unit 102 can use the new hash value or a subset of the new hash value as an index to identify the data entry 122 in the special symbol table 120 that corresponds to the appropriate instance of the received symbol for the WPAR 108. For example, as depicted in FIG. 1, if W1 represents the identifier of the WPAR 108, the symbol resolution unit 102 calculates an index 121 (with value 200_W1) based on the received symbol and the identifier of the WPAR 108. Also, if W2 represents the identifier of the WPAR 110, the symbol resolution unit 102 calculates an index 123 (with value 200_W2) based on the received symbol and the identifier of the WPAR 110. If the WPAR 108 transmitted the request for symbol resolution, the symbol resolution unit 102 looks up the index 200_W1 in the special symbol table 120 and identifies the data entry 122 that corresponds to the symbol instance of the WPAR 108. In FIG. 1, the data entry 122 that corresponds to the symbol instance for the WPAR 108 comprises a memory address 6000. Likewise, if the WPAR 110 had requested the symbol resolution, the symbol resolution unit 102 can calculate the index 123, identify the data entry 124 comprising memory location "6500" in the special symbol table 120, and provide the memory location "6500" to the WPAR 110.

In another implementation, the special symbol table 120 may be implemented as a hierarchical or multi-level symbol table and different instances of the received symbol may be indexed in the special symbol table 120 based on the WPAR identifiers. The symbol resolution unit 102 may identify a section of the special symbol table 120 that corresponds to the received symbol based on the hash value (or a subset of the hash value) of the symbol calculated at stage B1. Based on the identifier of the WPAR 108, the symbol resolution unit 102 can identify the data entry 122 that corresponds to the symbol instance associated with the WPAR 108 within the identified section of the special symbol table 120. In another implementation, the symbol resolution unit 102 can execute a linear search within the special symbol table 120 using the identifier of the WPAR 108 and the received symbol to identify the data entry 122 that corresponds to an appropriate symbol instance for the WPAR 108.

At stage D1, the symbol resolution unit 102 provides content of the data entry 122 that corresponds to the appropriate instance of the received symbol to the WPAR 108. With reference to FIG. 1, the symbol resolution unit 102 provides the memory address 6000 that constitutes the data entry 122 to the WPAR 108. The WPAR 108, in turn, can access the memory location 6000 to retrieve requisite content/information associated with the symbol and/or to read instruction(s) for subsequent processing of the symbol. For example, the memory location can reference a file, a function, a routine, a procedure, a binary module, etc. The WPAR 108 (or an application within the WPAR with which the symbol is associated) can store the memory location that maps to the symbol. On encountering the symbol subsequently, the WPAR 108 (or the application) can access the stored memory location and accordingly process the symbol. In some implementations, the symbol resolution unit 102 can write the memory location that maps to the symbol for the WPAR 108 to a predetermined data structure associated with the WPAR 108. When the WPAR 108 (or an application within the WPAR 108) executes, the WPAR 108 can access the predetermined data structure to determine appropriate memory locations for any symbols that might be referenced by the WPAR 108. It is noted that although FIG. 1 depicts the content of the data entry 122 as a memory location, in other embodiments the content of the data entry 122 can comprise other information such as declaration, type, and/or scope of the symbol.

However, if the symbol resolution unit 102 can identify a valid data entry that corresponds to the received symbol in the default symbol table 114, error processing operations including accessing the special symbol table 120 are not executed, thus minimizing overhead associated with processing non-conflicting symbols. This will be described below in stages B2 and C2.

At stage B2, the symbol resolution unit 102 accesses the default symbol table 114 and determines that a valid data entry 118 for the received symbol exists. As described above (in stage B1), the symbol resolution unit 102 generates a hash value of the symbol received at stage A, and uses the hash value of the symbol (or a subset of the hash value of the symbol) as an index 117 to identify the data entry 118 that corresponds to the symbol in the default symbol table 114. In FIG. 1, the symbol resolution unit 102 determines that the index 117 associated with the symbol is "100". The symbol resolution unit 102 looks up the index 117 in the default symbol table 114 and identifies the data entry 118 that corresponds to the index 117. The symbol resolution unit 102 also analyses the data entry 118 and determines that the data entry 118 that corresponds to the received symbol is a valid data entry. For example, based on knowledge that the data entries of the default symbol table 114 comprise memory addresses, the symbol resolution unit 102 may determine that content of the data entry 118 is within a valid range of memory addresses. In FIG. 1, the data entry 118 that corresponds to the received symbol comprises a memory address of 5000.

At stage C2, the symbol resolution unit 102 provides the content of the data entry 118 to the WPAR 108. With reference to FIG. 1, the symbol resolution unit 102 provides the memory address 5000 that constitutes the data entry 118 to the WPAR 108. The WPAR 108, in turn, can access the memory location 5000 to read the content associated with the symbol and/or to read instruction(s) for subsequent processing of the symbol. The WPAR 108 (or an application within the WPAR 108 with which the symbol is associated) can store the memory location that maps to the symbol. In some implementations, the symbol resolution unit 102 can write the memory location that maps to the symbol for the WPAR 108 to a predetermined data structure associated with the WPAR 108. On encountering the symbol subsequently, the WPAR 108 (or the application) can access the stored memory location and accordingly process the symbol.

It is noted that the symbol resolution unit 102 can keep track of the symbols with which the WPARs are associated. For example, as described above, WPAR 108 may load a first kernel extension that provides a first definition of a symbol "foo". The WPAR 110 may load a second kernel extension that provides a second definition of the same symbol "foo". The symbol resolution unit 102 can execute operations described herein so that the WPAR 108 receives the first definition if the WPAR 108 references the symbol "foo" and the WPAR 110 receives the second definition if the WPAR 110 references the symbol "foo". If the operating system 104 does not define the symbol "foo", the WPAR 112 should not have access to either the first definition or the second definition of the symbol "foo". However, if the operating system 104 provides a third definition of the symbol "foo", the WPAR 112 can receive the third definition if the WPAR 112 references the symbol "foo".

Figure 2:
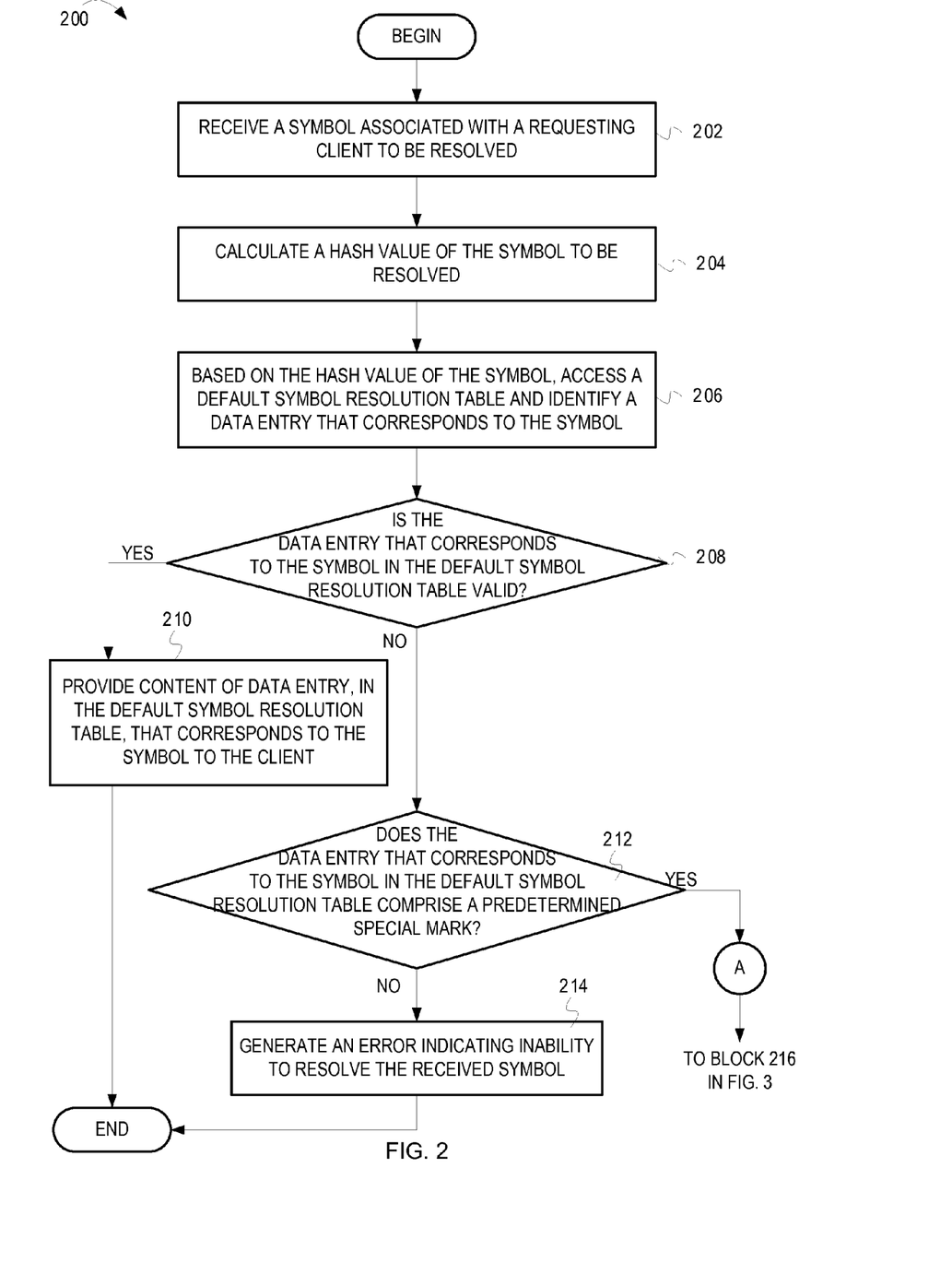
FIG. 2 depicts a flow diagram illustrating example operations for resolving operating system symbols.
Figure 3:
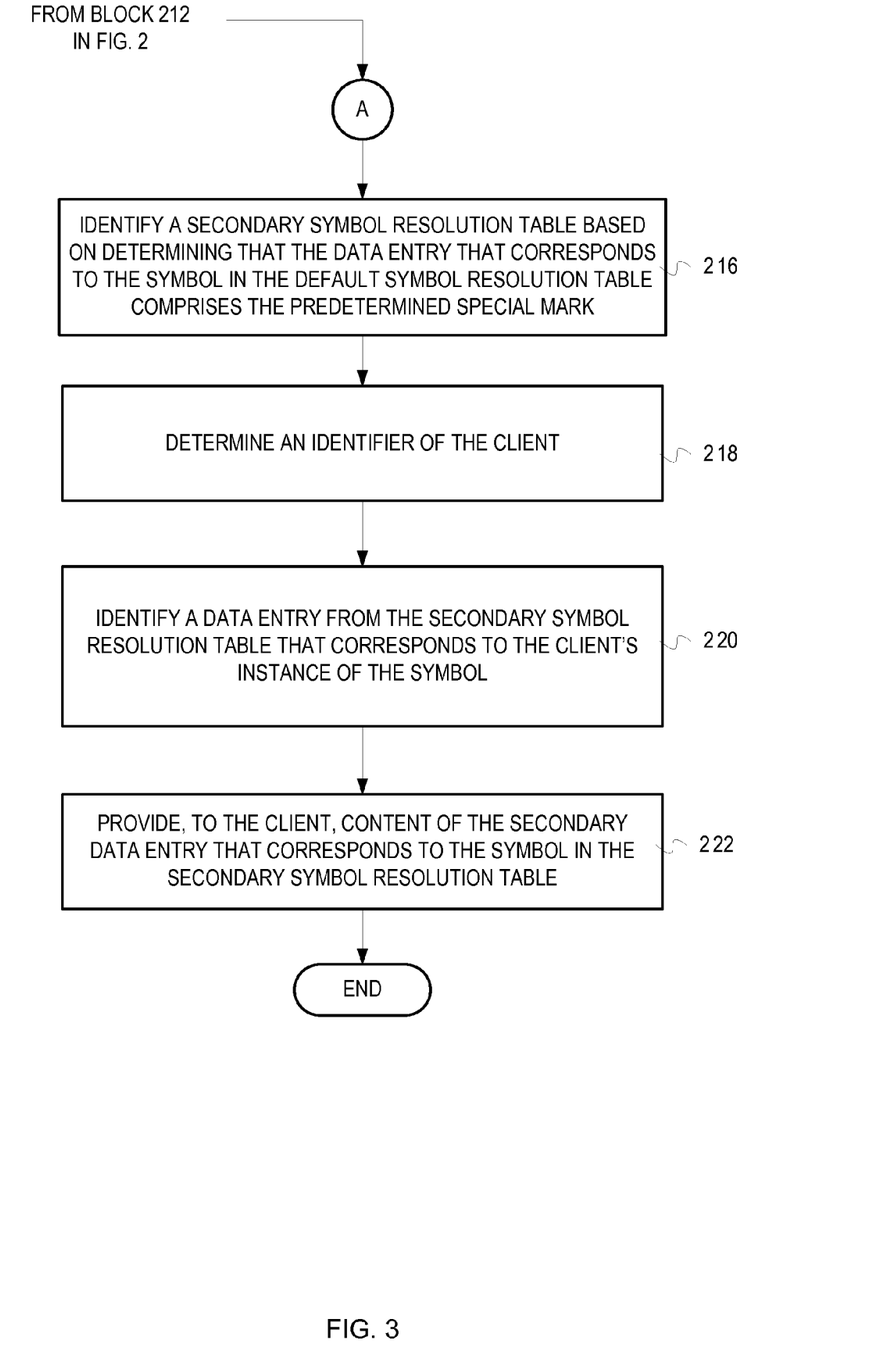
FIG. 3 is a continuation of FIG. 2 and also depicts the flow diagram illustrating example operations for resolving operating system symbols.

FIG. 2 and FIG. 3 depict a flow diagram illustrating example operations for resolving operating system symbols. Flow 200 begins at block 202 in FIG. 2.

A symbol, associated with a client, to be resolved is received (202). The client may be an application, a WPAR, or other client that requires resolution of symbols. An operating system kernel may receive the symbol to be resolved in response to an application or a kernel extension being loaded (e.g., within a WPAR). Applications or processes executing within the WPAR may reference symbols including functions, variables, and services of a kernel or may generate system calls to the kernel. Also, loaded kernel extensions may reference symbols within a base operating system kernel. When applications or kernel extensions are loaded, symbols referenced by the applications/kernel extensions are resolved (e.g., by the base operating system kernel). In other words, during symbol resolution, requisite information associated with the symbol is determined. The information associated with the symbol can comprise a memory location that references content corresponding to the symbol and/or instructions for subsequent processing of the symbol (e.g., a reference to a file, a function, a routine, a procedure, a binary module, etc.). The flow continues at block 204.

A hash value of the symbol is calculated (204). Any suitable hash algorithm can be used to calculate the hash value of the symbol. The flow continues at block 206.

A default symbol resolution table is accessed and a data entry that corresponds to the symbol is identified based on the hash value of the symbol (206). The default symbol table can comprise an indication of the symbol (e.g., a hash value or a truncated hash value associated with the symbol, a symbol identifier, etc.) and the data entry (comprising information associated with the symbol) that corresponds to the indication of the symbol. The hash value (or truncated hash value) of the symbol can be used as an index to identify the data entry that corresponds to the symbol in the default symbol resolution table. In some implementations, the default symbol table may be implemented as a hierarchical symbol table and different sections of the default symbol table may be accessed to identify the data entry that corresponds to the symbol based on the scope (or other properties such as the identifier) of the symbol. The flow continues at block 208.

It is determined whether the data entry that corresponds to the symbol in the default symbol resolution table is valid (208). For example, based on knowledge that data entries of the default symbol resolution table comprise memory addresses, the data entry (identified at block 206) that corresponds to the received symbol may be compared against a range of valid memory addresses. If it is determined that the data entry, in the default symbol resolution table, that corresponds to the symbol is valid, the flow continues at block 210. Otherwise, the flow continues at block 212.

Content of the data entry, in the default symbol resolution table, that corresponds to the symbol is provided to the client (210). For example, if the data entry comprises a memory address associated with the symbol, the memory address can be provided to the client (e.g., the WPAR). The WPAR can access the memory location associated with the symbol and can accordingly process the symbol based on information at the memory location. Additionally, the WPAR can store the memory location associated with the symbol to process subsequent references to the symbol. From block 210, the flow ends.

It is determined whether the data entry, in the default symbol resolution table, that corresponds to the symbol comprises a predetermined special mark (212). The flow 200 moves from block 208 to block 212 on determining that the data entry that corresponds to the symbol in the default symbol resolution table is invalid. In one implementation, symbol error processing operations as described with reference to blocks 212-222 may be executed to determine whether the symbol is a special symbol and can be resolved. As described above, because WPARs can operate independently of each other, symbols referenced by one WPAR may conflict with symbols referenced by another WPAR (e.g., when one WPAR references an older version of a symbol defined by the operating system kernel and the other WPAR references a new version of a symbol defined by a kernel extension). This can result in improper symbol resolution. The predetermined special mark indicates that the symbol received at block 202 is a conflicting operating system symbol and that information that corresponds to an instance of the received symbol that is specific to the WPAR with which the symbol is associated is to be determined. The predetermined special mark can be configured to be any suitable combination of characters, numbers, etc. If it is determined that the data entry that corresponds to the symbol in the default symbol resolution table comprises the predetermined special mark, the flow continues at block 216 in FIG. 3. Operations described with reference to blocks 216-222 can be executed to disambiguate the WPAR with which the received symbol is associated and to determine information that corresponds to the instance of the received symbol that is specific to the WPAR with which the symbol is associated. Otherwise, the flow continues at block 214.

An error indicating inability to resolve the received symbol is generated (214). The flow 200 moves from block 212 to block 214 on determining that the data entry that corresponds to the received symbol is invalid and that the data entry that corresponds to the received symbol does not comprise the predetermined special mark in the default symbol resolution table. Because the data entry that corresponds to the received symbol does not comprise the predetermined special mark, additional processing operations (e.g., accessing a secondary symbol resolution table) need not be executed to resolve the received symbol. An error message indicating inability to resolve the received symbol can be provided to the WPAR that generated the request for symbol resolution. The error message can identify the symbol and can indicate a reason for failed symbol resolution. For example, the error message can indicate that a data entry corresponding to the received symbol could not be found in the default symbol resolution table, that the identified data entry does not comprise a valid memory location, etc. From block 214, the flow ends.

A secondary symbol resolution table is identified based on determining that the data entry that corresponds to the symbol in the default symbol resolution table comprises the predetermined special mark (216). The flow 200 moves from block 212 in FIG. 2 to block 216 in FIG. 3 on determining that the data entry, in the default symbol resolution table, that corresponds to the received symbol was invalid because the data entry comprises the predetermined special mark. The secondary symbol resolution table comprises WPAR-specific resolutions for the received symbol. In other words, the secondary symbol resolution table can comprise multiple data entries that correspond to the symbol but that correspond to a different WPAR. Thus, the secondary symbol resolution table comprises a data entry for each WPAR for which a unique definition of the symbol exists. For example, an operating system may define a first, a second, and a third WPAR. The first and the second WPARs may be associated with different symbol definition for a symbol, while a global operating system and the third WPAR may not define the symbol. Consequently, the secondary symbol resolution table can comprise two data entries—one data entry that corresponds to the first WPAR's instance of the symbol (e.g., a first symbol resolution) and another data entry that corresponds to the second WPAR's instance of the symbol (e.g., a second symbol resolution). The third WPAR may not receive a symbol resolution for the symbol because the third WPAR and the global operating system do not define the symbol. The flow continues at block 218.

An identifier of the client is determined (218). For example, an identifier of the WPAR that requested the symbol resolution can be determined from the request for symbol resolution received at block 202. As another example, a WPAR management unit can be queried to determine the identifier of the WPAR that requested the symbol resolution. If the client is an application or a process, an application/process identifier can be determined. The flow continues at block 220.

A secondary data entry that corresponds to the client's instance of the symbol is identified from the secondary symbol resolution table, based on the identifier of the client and the symbol to be resolved (220). In one implementation, a new hash value can be calculated based on the received symbol and the WPAR identifier. The secondary data entry that corresponds to the WPAR's instance of the symbol can be identified from the secondary symbol resolution table based on the new hash value. In another implementation, based on the hash value of the symbol (calculated at block 204), an array (or a section of the secondary symbol resolution table) that comprises WPAR-specific resolutions for the received symbol can be identified. A secondary data entry (within the array) that corresponds to the WPAR's instance of the symbol can be determined based on knowledge of the WPAR identifier. For example, a WPAR identifier of 01 may correspond to an array index of "00" indicating that the secondary data entry to be provided to the WPAR with identifier 01 is the first element of the array. In another implementation, the secondary symbol resolution table may be implemented as a hierarchical or multi-level symbol table and different instances of the received symbol may be indexed in the secondary symbol resolution table based on the WPAR identifiers. In another implementation, a linear search can be performed within the secondary symbol resolution table using the identifier of the WPAR and the received symbol to identify the secondary data entry that corresponds to an appropriate symbol instance for the WPAR. The flow continues at block 222.

Content of the secondary data entry that corresponds to the symbol in the secondary symbol resolution table is provided to the client (block 222). For example, if the secondary data entry comprises a memory address associated with the symbol, the memory address can be provided to the WPAR (or other client). The WPAR can access the memory location associated with the symbol for which symbol resolution was requested at block 202 and can retrieve requisite content/information associated with the symbol and/or can read instruction(s) for subsequent processing of the symbol. The WPAR 108 (or an application within the WPAR with which the symbol is associated) can also store the memory location associated with the symbol. In some implementations, the symbol resolution unit 102 can write the memory location that maps to the symbol for the WPAR 108 to a predetermined data structure associated with the WPAR 108. On encountering the symbol subsequently, the WPAR 108 (or the application) can access the predetermined data structure, identify the memory location associated with the symbol (i.e., the version of the symbol that is specific to the WPAR 108) and can accordingly process the symbol. From block 222, the flow ends.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-3 depict two symbol resolution tables—a default symbol resolution table and a secondary symbol resolution table, in some implementations only a single symbol resolution table may be implemented. The symbol resolution table may be implemented as a dual level hash table. A first section (subset of memory locations within the symbol resolution table) may comprise the default section of the symbol resolution table. On identifying the predetermined special mark that invalidates symbol resolution in the default section of the symbol resolution table, control can move to a second section (subset of memory locations that comprises symbol resolutions for the special symbols). Depending on the number of data entries within the secondary section of the symbol resolution table, either a hash value of the symbol and the WPAR identifier can be used to identify the appropriate data entry or a linear search can be performed to identify the appropriate secondary data entry and WPAR-specific symbol resolution.

It is noted that although FIGS. 1-4 describe operations for resolving conflicting symbols between WPARs, between a WPAR and a global operating system, between a CRE WPAR and the global operating system, embodiments are not restricted to WPARs. Operations for resolving conflicting symbols as described herein can be extended to applications/processes (e.g., resolving conflicts between symbols generated by different versions of an application, different applications, etc.) and to other implementations that require different versions of a symbol/application/function/etc. to be maintained. For example, an appropriate symbol resolution may be provided to an application based on an application identifier.

At an operating system level, the symbols can be identified as conflicting symbols (i.e., special symbols) or non-conflicting symbols (based on whether the data entry associated with the symbols comprises the predetermined special mark in the global symbol table). For example, a kernel developer could identify the conflicting operating system symbols and invalidate data entries that correspond to the conflicting operating system symbols in the default symbol resolution table by inserting the predetermined special mark. As another example, a kernel process that is transparent to the WPARs 108, 100, and 112 could analyze the symbols associated with the WPARs 108, 100, and 112 and could identify the conflicting operating system symbols. The conflicting operating system symbols can be identified as symbols that are generated by different WPARs and that have the same symbol name but a different symbol resolution (e.g., a different version of the symbol). It is noted that the applications and/or the WPARs are oblivious to whether or not the symbols generated by the applications/WPARs are conflicting operating system symbols.

Techniques for symbol processing as described herein can enable symbol linking based on symbol name irrespective of the version of the symbol being used. The version of the symbol is implicitly identified based on the identifier of the client (e.g., the WPAR identifier). The version of the symbol provided to the WPAR is tied to the version of the symbol requested by and executing on the WPAR. Furthermore, the default symbol resolution table and the secondary symbol resolution table need not be updated if the WPAR switches from one version (e.g., of a program, kernel extension, or even operating system in case of a CRE WPAR) to another version. Instead, after the WPAR is rebooted and a new version of the symbol is generated, the symbol resolution corresponding to the new version of the symbol is provided to the WPAR. For example, an operating system may comprise two versions of a kernel extension that define the same symbol (thus making the symbol a conflicting operating system symbol). In a first invocation of a WPAR, a WPAR administrator could allow a first version of the kernel extension to load and the symbol resolution unit 102 could provide (based on accessing the secondary symbol resolution table 120) symbol resolution corresponding to the symbol in the first version of the kernel extension. In a second invocation of the WPAR, the WPAR administrator could allow a second version of the kernel extension to load and the symbol resolution unit 102 could provide (based on accessing the secondary symbol resolution table 120) symbol resolution corresponding to the symbol in the second version of the kernel extension.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
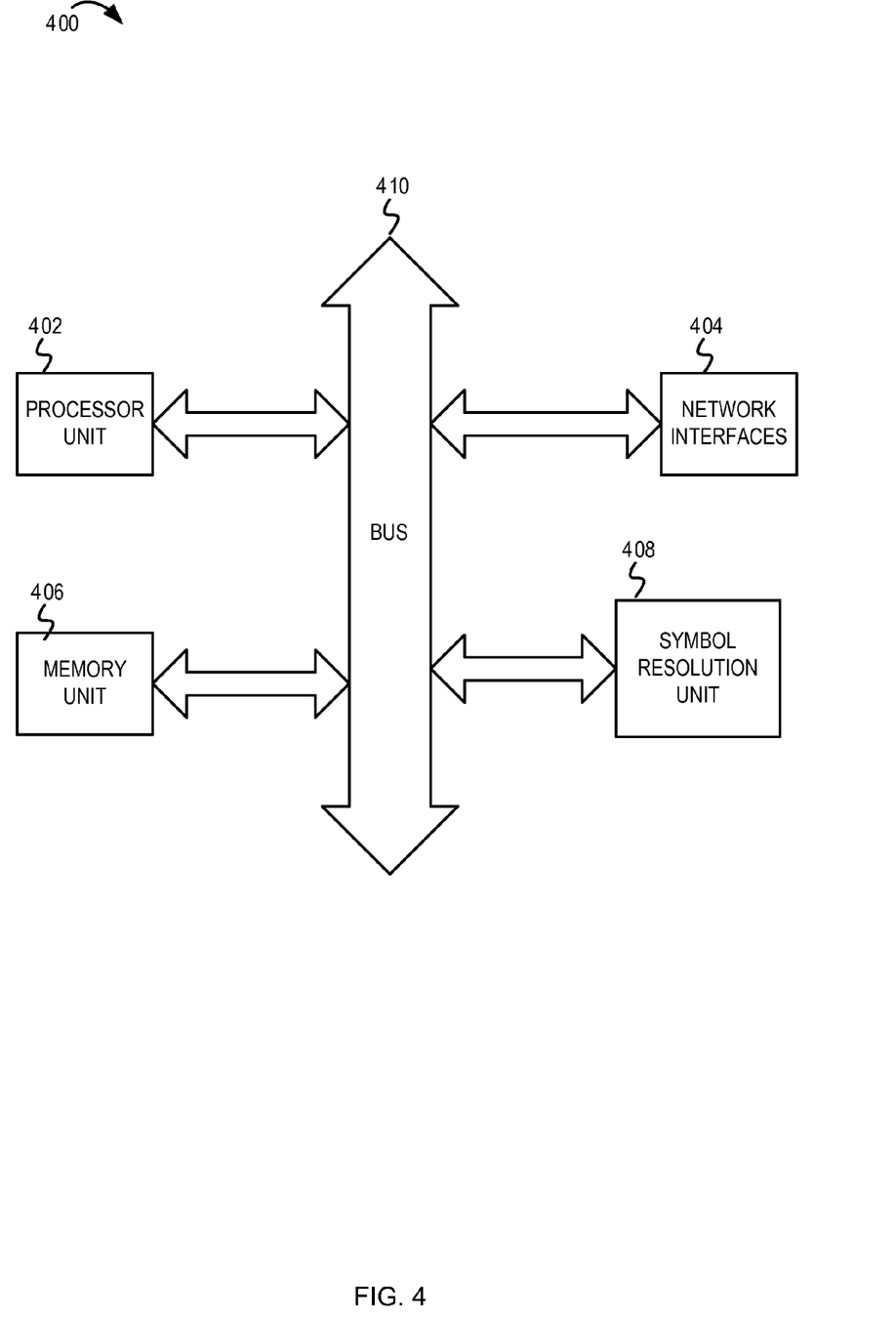
FIG. 4 is a block diagram of one embodiment of a computer system including a mechanism for resolving conflicting operating system symbols.

FIG. 4 is a block diagram of one embodiment of a computer system 400 including a mechanism for resolving conflicting operating system symbols. The computer system 400 includes a processor unit 402 (possibly including multiple processors, multiple cores, multiple nodes, and/or implementing multi-threading, etc.). The computer system 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 400 also includes a bus 410 (e.g., PCI, ISA, PCI-Express, HyperTransport®, InfiniBand®, NuBus, AHB, AXI, etc.), and network interfaces 404 that include at least one wireless network interface (e.g., a WLAN interface, a Bluetooth® interface, a WiMAX interface, a ZigBee® interface, a Wireless USB interface, etc.).

The computer system 400 also includes a symbol processing unit 408. The symbol processing unit 408 implements functionality to determine whether a symbol to be resolved is identified as a conflicting operating system symbol. The symbol processing unit 408 determines whether a data entry corresponding to the symbol in a default symbol resolution table (which may be implemented in the memory unit 406) is invalidated by a predetermined special mark. If so, the symbol processing unit 408 accesses a secondary symbol resolution table (which may also be implemented in the memory unit 406). The symbol processing unit 408 resolves the symbol based on symbol information (e.g., a symbol identifier) and an identifier of a client that requested the symbol resolution as described with reference to FIG. 1-3.

In some embodiments, the computer system 400 can include additional devices and/or more than one of each component shown in FIG. 4 (e.g., video cards, audio cards, peripheral devices, etc.). For example, in some instances, the computer system 400 may include multiple processor units, multiple cores, multiple external CPU's. In other instances, components may be integrated or subdivided. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.).

While the embodiments are described with reference to various implementations and exploitations, it will be understood that these embodiments are illustrative and that the scope of the inventive subject matter is not limited to them. In general, techniques for minimizing overhead in resolving operating system symbols as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of resolving conflicting symbols comprising:
receiving an indication that a first symbol should be added to a symbol resolution data structure, wherein the first symbol is associated with a first symbol name, wherein the first symbol is associated with a first client of an operating system;
in response to said receiving the indication that the first symbol should be added to the symbol resolution data structure, determining that the first symbol name exists in a default symbol resolution data structure;
in response to said determining that the first symbol name exists in the default symbol resolution structure,
indicating in a first data entry that the first symbol is a conflicting symbol wherein the default symbol resolution data structure comprises the first data entry; and
inserting a second data entry into a secondary symbol resolution data structure, wherein the second data entry identifies the first symbol and an identifier of the first client of the operating system;
receiving a first request to resolve the first symbol, wherein the first request comprises an identifier of the first client of the operating system;
in response to said receiving the first request to resolve the first symbol,
locating the first data entry in the default symbol resolution data structure;
determining that the first data entry indicates that the first symbol is a conflicting symbol;
in response to said determining that the first data entry indicates that the first symbol is a conflicting symbol, locating the second data entry in the secondary symbol resolution data structure based, at least in part, on the identifier of the first client of the operating system; and
providing, to the first client of the operating system, a first memory location, wherein the first memory location is indicated in the second data entry;
receiving a second request to resolve the first symbol, wherein the second request comprises an identifier of a second client of the operating system;
in response to said receiving the second request to resolve the first symbol,
locating the first data entry in the default symbol resolution data structure;
determining that the first data entry indicates that the first symbol is a conflicting symbol;
in response to said determining that the first data entry indicates that the first symbol is a conflicting symbol, locating a third data entry based, at least in part, on the identifier of the second client of the operating system, wherein the secondary symbol resolution data structure comprises the third data entry; and
providing, to the second client of the operating system, a second memory location, wherein the second memory location is indicated in the third data entry,
wherein the first client of the operating system and the second client of the operating system each comprise one of a workload partition, a compatibility runtime environment workload partition, and an application.

2. The method of claim 1, further comprising:
receiving a third request to resolve a second symbol, wherein the third request comprises an identifier of the first client of the operating system;
locating a fourth data entry, wherein the default symbol resolution data structure comprises the fourth data entry, wherein the fourth data entry corresponds to the second symbol;
determining that the fourth data entry does not indicate that the second symbol is a conflicting symbol; and
providing, to the first client of the operating system, a third memory location, wherein the third memory location is indicated in the fourth data entry.

3. The method of claim 1,
wherein said locating the first data entry in the default symbol resolution data structure comprises,
calculating a hash value of the first symbol to determine an index into the default symbol resolution data structure;
accessing the first data entry based, at least in part, on the index;
wherein said determining that the first data entry indicates that the first symbol is a conflicting symbol comprises,
determining that the first data entry comprises a predetermined special mark.

4. The method of claim 1, wherein said determining that the first data entry indicates that the first symbol is a conflicting symbol comprises determining that the first data entry is marked as invalid.

5. The method of claim 1, wherein said locating the second data entry in the secondary symbol resolution data structure based, at least in part, on the identifier of the first client of the operating system comprises:
determining an index into the secondary symbol resolution data structure that corresponds to the first symbol based, at least in part, on the identifier of the first client of the operating system; and
accessing the second data entry based, at least in part, on the index that corresponds to the first symbol.

6. The method of claim 1, wherein the default symbol resolution data structure comprises a hash table, and wherein the secondary symbol resolution data structure comprises one of a hash table and a linear search table.

7. The method of claim 1, wherein the first memory location resolves to a first set of instructions associated with the first symbol, wherein the second memory location resolves to a second set of instructions associated with the first symbol.

8. The method of claim 1, wherein the first symbol is associated with an operating system kernel extension.

9. A computer program product for resolving conflicting operating system symbols, the computer program product comprising:

a computer readable storage medium having computer usable program code embodied therewith, the computer usable program code to,
  detect an indication that a first symbol should be added to a symbol resolution data structure, wherein the first symbol is associated with a first symbol name, wherein the first symbol is associated with a first client of an operating system;
  in response to said detection of the indication that the first symbol should be added to the symbol resolution data structure, determine that the first symbol name exists in a default symbol resolution data structure;
  in response to said determination that the first symbol name exists in the default symbol resolution structure,
    indicate in a first data entry that the first symbol is a conflicting symbol, wherein the default symbol resolution data structure comprises the first data entry; and
    insert a second data entry into a secondary symbol resolution data structure, wherein the second data entry identifies the first symbol and an identifier of the first client of the operating system;
  detect a first request to resolve the first symbol, wherein the first request comprises an identifier of the first client of the operating system;
  in response to said detection of the first request to resolve the first symbol,
    locate the first data entry in the default symbol resolution data structure;
    determine that the first data entry indicates that the first symbol is a conflicting symbol;
    in response to said determination that the first data entry indicates that the first symbol is a conflicting symbol, locate the second data entry in the secondary symbol resolution data structure base, at least in part, on the identifier of the first client of the operating system; and
    provide, to the first client of the operating system, a first memory location, wherein the first memory location is indicated in the second data entry;
  detect a second request to resolve the first symbol, wherein the second request comprises an identifier of a second client of the operating system;
  in response to said detection of the second request to resolve the first symbol, locate the first data entry in the default symbol resolution data structure; determine that the first data entry indicates that the first symbol is a conflicting symbol;
  in response to said determination that the first data entry indicates that the first symbol is a conflicting symbol, locate a third data entry based, at least in part, on the identifier of the second client of the operating system, wherein the secondary symbol resolution data structure comprises the third entry; and
  provide, to the second client of the operating system, a second memory location, wherein the second memory location is indicated in the third data entry,
  wherein the first client of the operating system and the second client of the operating system each comprise one of a workload partition, a compatibility runtime environment workload partition, and an application.

10. The computer program product of claim 9, wherein the computer usable program code comprises computer usable program code to:
  detect a third request to resolve a second symbol, wherein the third request comprises an identifier of the first client of the operating system;
  locating a fourth data entry, wherein the default symbol resolution data structure comprises the fourth data entry, wherein the fourth data entry corresponds to the second symbol;
  determining that the fourth data entry does not indicate that the second symbol is a conflicting symbol; and
  providing, to the first client of the operating system, a third memory location, wherein the third memory location is indicated in the fourth data entry.

11. The computer program product of claim 9,
  wherein the computer usable program code to locate the first data entry in the default symbol resolution data structure comprises computer usable program code:
    calculate a hash value of the first symbol to determine an index into the default symbol resolution data structure; and
    access the first data entry based, at least in part, on the index;
  wherein the computer usable program code to determine that the first data entry indicates that the first symbol is a conflicting symbol comprises computer usable program code to:
    determine that the first data entry comprises a predetermined special mark.

12. The computer program product of claim 9, wherein the computer usable program code to determine that the first data entry indicates that the first symbol is a conflicting symbol comprises computer usable program code to determine that the first data entry is marked as invalid.

13. The computer program product of claim 9, wherein the computer usable program code to locate the second data entry in the secondary symbol resolution data structure based, at least in part, on the identifier of the first client of the operating system comprises computer usable program code to:
  determine an index into the secondary symbol resolution data structure that corresponds to the first symbol based, at least in part, on the identifier of the first client of the operating system; and
  access the second data entry based, at least in part, on the index that corresponds to the first symbol.

14. The computer program product of claim 9, wherein the first symbol is associated with an operating system kernel extension.

15. An apparatus comprising:
  a processor;
  a network interface coupled with the processor; and
  a computer readable storage medium having computer usable program code embodied therewith, the computer usable program code executable by the processor to cause the apparatus to,
    detect an indication that a first symbol should be added to a symbol resolution data structure, wherein the first symbol is associated with a first symbol name, wherein the first symbol is associated with a first client of an operating system;
    in response to said detection of the indication that the first symbol should be added to the symbol resolution data structure, determine that the first symbol name exists in a default symbol resolution data structure;
    in response to said determination that the first symbol name exists in the default symbol resolution structure,
      indicate in a first data entry that the first symbol is a conflicting symbol, wherein the default symbol resolution data structure comprises the first data entry; and
      insert a second data entry into a secondary symbol resolution data structure, wherein the second data entry identifies the first symbol and an identifier of the first client of the operating system;

detect a first request to resolve the first symbol, wherein the first request comprises an identifier of the first client of the operating system;

in response to said detection of the first request to resolve the first symbol,
locate the first data entry in the default symbol resolution data structure;
determine that the first data entry indicates that the first symbol is a conflicting symbol;
in response to said determination that the first data entry indicates that the first symbol is a conflicting symbol, locate the second data entry in the secondary symbol resolution data structure base, at least in part, on the identifier of the first client of the operating system; and
provide, to the first client of the operating system, a first memory location, wherein the first memory location is indicated in the second data entry;

detect a second request to resolve the first symbol, wherein the second request comprises an identifier of a second client of the operating system;

in response to said detection of the second request to resolve the first symbol, locate the first data entry in the default symbol resolution data structure; determine that the first data entry indicates that the first symbol is a conflicting symbol;

in response to said determination that the first data entry indicates that the first symbol is a conflicting symbol, locate a third data entry based, at least in part, on the identifier of the second client of the operating system, wherein the secondary symbol resolution data structure comprises the third entry; and provide, to the second client of the operating system, a second memory location, wherein the second memory location is indicated in the third data entry, wherein the first client of the operating system and the second client of the operating system each comprise one of a workload partition, a compatibility runtime environment workload partition, and an application.

16. The apparatus of claim 15,
wherein the computer usable program code being executable by the processor to cause the apparatus to locate the first data entry in the default symbol resolution data structure comprises computer usable program code executable by the processor to cause the apparatus to:
calculate a hash value of the first symbol to determine an index into the default symbol resolution data structure; and
access the first data entry based, at least in part, on the index;
wherein the computer usable program code being executable by the processor to cause the apparatus to determine that the first data entry indicates that the first symbol is a conflicting symbol comprises computer usable program code executable by the processor to cause the apparatus to:
determine that the first data entry comprises a predetermined special mark.

17. The apparatus of claim 15, wherein the computer usable program code further comprises computer usable program code executable by the processor to cause the apparatus to:
detect a third request to resolve a second symbol, wherein the third request comprises an identifier of the first client of the operating system;
locating a fourth data entry, wherein the default symbol resolution data structure comprises the fourth data entry, wherein the fourth data entry corresponds to the second symbol;
determining that the fourth data entry does not indicate that the second symbol is a conflicting symbol; and
providing, to the first client of the operating system, a third memory location, wherein the third memory location is indicated in the fourth data entry.

18. The apparatus of claim 15, wherein the computer usable program code being executable by the processor to cause the apparatus to locate the second data entry in the secondary symbol resolution data structure based, at least in part, on the identifier of the first client of the operating system comprises computer usable program code executable by the processor to cause the apparatus to:
determine an index into the secondary symbol resolution data structure that corresponds to the first symbol based, at least in part, on the identifier of the first client of the operating system; and
access the second data entry based, at least in part, on the index that corresponds to the first symbol.

19. The apparatus of claim 15, wherein the default symbol resolution data structure comprises a hash table, and wherein the secondary symbol resolution data structure comprises one of a hash table and a linear search table.

20. The apparatus of claim 15, wherein the first symbol is associated with an operating system kernel extension.

* * * * *